US010084179B2

(12) United States Patent
Tanihara et al.

(10) Patent No.: US 10,084,179 B2
(45) Date of Patent: Sep. 25, 2018

(54) POWDER COATING APPARATUS AND METHOD FOR MANUFACTURING ELECTRODE FOR LITHIUM ION BATTERY USING THE SAME

(71) Applicants: TOYOTA JIDOSHA KABUSHIKI KAISHA, Toyota-shi, Aichi (JP); Zeon Corporation, Tokyo (JP)

(72) Inventors: Koichi Tanihara, Miyoshi (JP); Yasuhiro Sakashita, Nissin (JP); Yuji Shibata, Tokyo (JP); Hiroyuki Sekine, Tokyo (JP)

(73) Assignees: TOYOTA JIDOSHA KABUSHIKI KAISHA, Toyota-shi, Aichi (JP); Zeon Corporation, Tokyo (JP)

( * ) Notice: Subject to any disclaimer, the term of this patent is extended or adjusted under 35 U.S.C. 154(b) by 0 days.

(21) Appl. No.: 14/780,604

(22) PCT Filed: Feb. 14, 2014

(86) PCT No.: PCT/JP2014/053429
§ 371 (c)(1),
(2) Date: Sep. 28, 2015

(87) PCT Pub. No.: WO2014/156357
PCT Pub. Date: Oct. 2, 2014

(65) Prior Publication Data
US 2016/0043382 A1    Feb. 11, 2016

(30) Foreign Application Priority Data
Mar. 29, 2013 (JP) ................. 2013-074192

(51) Int. Cl.
*B05C 19/04* (2006.01)
*B05D 1/00* (2006.01)
(Continued)

(52) U.S. Cl.
CPC ........ *H01M 4/0435* (2013.01); *B05C 1/0813* (2013.01); *B05C 9/04* (2013.01);
(Continued)

(58) Field of Classification Search
USPC ................... 118/308, 325; 427/180
See application file for complete search history.

(56) References Cited

U.S. PATENT DOCUMENTS 4,790,257 A * 12/1988 Schermutzki ........... B29B 15/12
                                                            118/227
8,715,780 B2 * 5/2014 Bruderer ................... B05C 9/12
                                                            118/308
(Continued)

FOREIGN PATENT DOCUMENTS

EP       0042051 A2 * 12/1981 ........ G03G 15/0877
JP       53-115167 U    9/1978
(Continued)

OTHER PUBLICATIONS

International Search Report of PCT/JP2014/053429 dated May 20, 2014 [PCT/ISA/210].

*Primary Examiner* — Yewebdar T Tadesse
(74) *Attorney, Agent, or Firm* — Sughrue Mion, PLLC (57) ABSTRACT

Provided is a technique capable of evenly smoothing powder supplied to the surface of a supply member. A powder coating apparatus includes a pair of press rollers, hoppers, and squeegee rollers disposed such that prescribed gaps are formed between the squeegee rollers and the press rollers, and adjusting thickness of the powder by smoothing the powder supplied to each outer circumferential surface of the press rollers. The powder coating apparatus presses the powder, smoothed by the squeegee rollers, between the press rollers to form compressed powder layers on both the surfaces of the web. The squeegee roller is formed in a column having an axis being parallel to the outer circum-
(Continued)

ferential surface of the press roller and being orthogonal to a moving direction of the outer circumferential surface of the press roller.

5 Claims, 5 Drawing Sheets

(51) Int. Cl.
  *H01M 4/04* (2006.01)
  *H01M 4/139* (2010.01)
  *B05C 1/08* (2006.01)
  *B05C 9/04* (2006.01)
  *H01M 10/0525* (2010.01)
  *H01M 10/052* (2010.01)

(52) U.S. Cl.
  CPC ......... *H01M 4/043* (2013.01); *H01M 4/0404* (2013.01); *H01M 4/0409* (2013.01); *H01M 4/139* (2013.01); *H01M 10/0525* (2013.01); *H01M 10/052* (2013.01)

(56) References Cited

U.S. PATENT DOCUMENTS

| | | |
|---|---|---|
| 2002/0132167 A1 | 9/2002 | Gan et al. |
| 2009/0224198 A1 | 9/2009 | Mori et al. |

FOREIGN PATENT DOCUMENTS

| | | |
|---|---|---|
| JP | 01-099469 U | 7/1989 |
| JP | 05-139543 A | 6/1993 |
| JP | 06-134374 A | 5/1994 |
| JP | 11-135116 A | 5/1999 |
| JP | 2001-015117 A | 1/2001 |
| JP | 2002-367601 A | 12/2002 |
| JP | 2003-155124 A | 5/2003 |
| JP | 2005-144414 A | 6/2005 |
| JP | 2005-211762 A | 8/2005 |
| JP | 2007-005747 A | 1/2007 |
| JP | 2008-284806 A | 11/2008 |
| JP | 2009-212113 A | 9/2009 |
| JP | 2011-216504 A | 10/2011 |
| JP | 2012-129536 A | 7/2012 |

* cited by examiner

PRIOR ART

POWDER COATING APPARATUS AND METHOD FOR MANUFACTURING ELECTRODE FOR LITHIUM ION BATTERY USING THE SAME

CROSS REFERENCE TO RELATED APPLICATIONS

This application is a National Stage of International Application No. PCT/JP2014/053429, filed Feb. 14, 2014, claiming priority based on Japanese Patent Application No. 2013-074192, filed Mar. 29, 2013, the contents of all of which are incorporated herein by reference in their entirety.

TECHNICAL FIELD

The present invention relates to a powder coating apparatus and method for manufacturing an electrode for a lithium ion battery using the powder coating apparatus.

BACKGROUND ART

Conventionally, there is known technology for coating the surface of a web with powder while conveying the web.

For example, JP 2011-216504 A discloses technology for coating the surface of a collector (the web) as a long metal sheet with composite material (the powder) containing active material.

In the technology described in JP 2011-216504 A, the thickness of the coated powder is evenly adjusted by smoothing the powder with a blade-shaped squeegee after supplying the powder to the surface of the web (see paragraph [0047] in JP 2011-216504 A).

Figure 5:
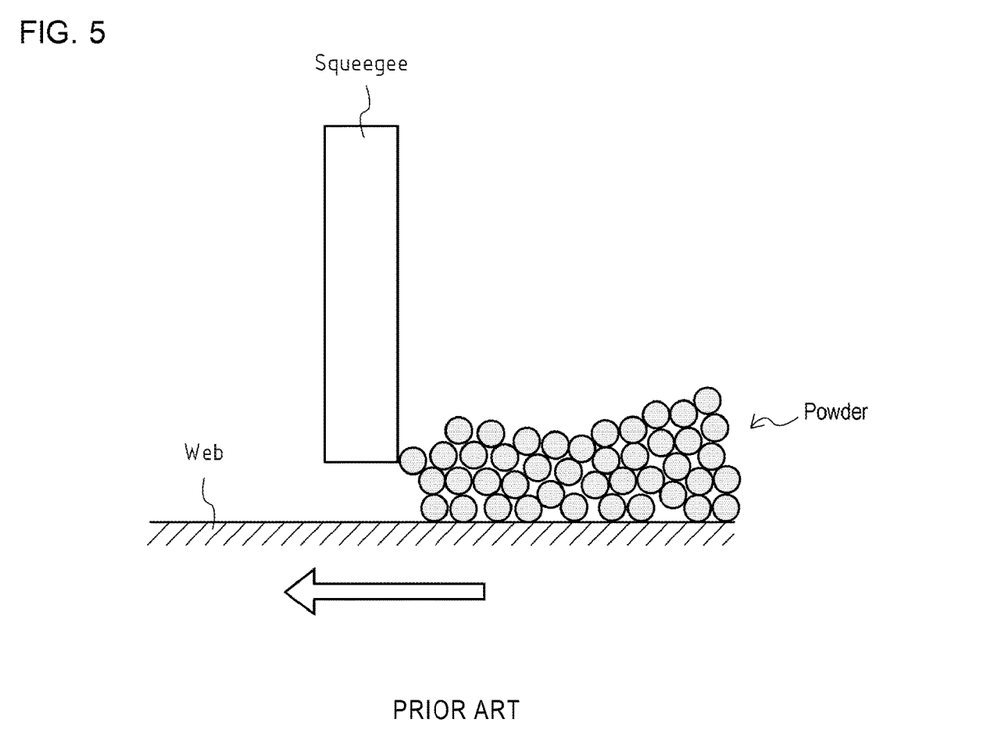
FIG. 5 shows a state where the powder stays on a conventional squeegee.

However, as shown in FIG. 5, when the powder comes in contact with the squeegee, the powder receives the force acting in the opposite direction of the moving direction thereof (in the conveying direction of the web), and therefore the powder may stay (a bridge may be formed) on the upstream side in the conveying direction of the web relative to the squeegee.

Therefore, it is difficult to evenly smooth the powder supplied to the surface of the web by the technology described in JP 2011-216504 A.

The white-painted arrow in FIG. 5 indicates the conveying direction of the web.

CITATION LIST

Patent Literature

PTL1: JP 2011-216504 A

SUMMARY OF INVENTION

Technical Problem

The object of the present invention is to provide technology capable of evenly smoothing powder supplied to the surface of a supply member.

Solution to Problem

A first aspect of the invention is a powder coating apparatus including a driving device driving a supply member having a continuous surface such that the surface moves in a prescribed direction, a powder supplying device supplying powder to the surface of the supply member, a squeegee disposed such that a prescribed gap is formed between the squeegee and supply member, and adjusting thickness of the powder by smoothing the powder supplied to the surface of the supply member by the powder supplying device, and a pressing device pressing the powder smoothed by the squeegee.

The squeegee is formed in a column having an axis being parallel to the surface of the supply member and being orthogonal to a moving direction of the surface of the supply member.

Preferably, the squeegee is rotationally driven such that a part of an outer circumferential surface thereof facing the surface of the supply member moves in the direction opposite to the moving direction of the surface of the supply member.

Preferably, the squeegee vibrates such that the shortest distance between the outer circumferential surface of the squeegee and the surface of the supply member is kept.

A second aspect of the invention is a method for manufacturing an electrode for a lithium ion battery forming a compressed powder layer made of the powder containing active material on at least one surface of a collector made of a metal sheet, using the powder coating apparatus.

Advantageous Effects of Invention

In accordance with the present invention, powder supplied to the surface of a supply member can be evenly smoothed.

DESCRIPTION OF EMBODIMENTS

Hereinafter, a powder coating apparatus 1 as an embodiment of a powder coating apparatus according to the present invention is described with reference to FIGS. 1 and 2.

The powder coating apparatus 1 coats the surface of a web W with powder P while the web W is conveyed by a prescribed conveying device (not illustrated). In detail, the powder coating apparatus 1 continuously supplies the powder P to both the surfaces of the web W and forms compressed powder layers L on both the surfaces of the web W by continuously pressing the powder P, while the web W is conveyed by the conveying device.

The conveying device continuously unwinds the web W from a roll thereof, and winds the web W where compressed powder layers L are formed on both the surfaces thereof into a roll. Guide rollers rotating according to the movement of the web W, and a controller for correcting the meander of the web W are suitably provided on a conveying route of the web W.

The web W is a long sheet. In the present embodiment, the web W is a collector made of a metal sheet.

The powder P is granular material. In the present embodiment, the powder P is a group of particles containing the active material.

The compressed powder layer L is a layer made of the pressed powder P.

Figure 1:
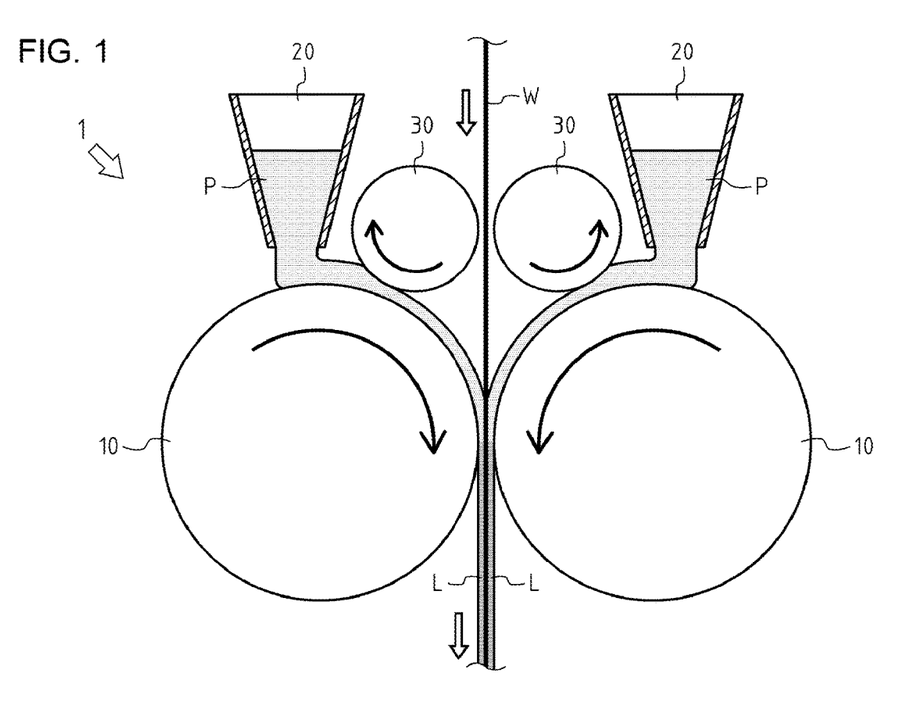
FIG. 1 shows a powder coating apparatus according to an embodiment of the present invention.

As shown in FIG. 1, the powder coating apparatus 1 includes two press rollers 10, two hoppers 20 and two squeegee rollers 30. One press roller 10, one hopper 20 and one squeegee roller 30 (the press roller 10, the hopper 20 and the squeegee roller 30 positioned to the right of the web W in FIG. 1), and the other press roller 10, the other hopper 20 and the other squeegee roller 30 (the press roller 10, the hopper 20 and the squeegee roller 30 positioned to the left of the web W in FIG. 1) are disposed in line symmetry.

The top-bottom direction in FIG. 1 corresponds to the vertical direction. The right-left direction in FIG. 1 corresponds to the horizontal direction.

One press roller 10, one hopper 20 and one squeegee roller 30 are respectively configured similarly to the other press roller 10, the other hopper 20 and the other squeegee roller 30. Therefore, one press roller 10, one hopper 20 and one squeegee roller 30 are only explained except as specially explained.

The press roller 10 is formed in a column. The press rollers 10 are horizontally disposed such that the axes thereof are parallel to each other. The press rollers 10 are disposed at a prescribed interval so as to nip the web W conveyed downward in the vertical direction. In detail, the press rollers 10 disposed such that the outer circumferential surface of one press roller 10 faces one surface of the web W and the outer circumferential surface of the other press roller 10 faces the other surface of the web W. The press rollers 10 are rotationally driven in opposite directions (see the arrows on the press rollers 10 in FIG. 1) by a prescribed driving device (not illustrated).

The hopper 20 is an embodiment of a powder supplying device according to the present invention. The hopper 20 stores the powder P thereinside and supplies the powder P to the outer circumferential surface of the press roller 10. The hopper 20 is disposed on the upstream side in the moving direction of the powder P relative to the position (hereinafter, referred to as the "press position") where the outer circumferential surfaces of the press rollers 10 are closest to each other. Therefore, the powder P supplied from the hopper 20 to the outer circumferential surface of the press roller 10 is to arrive at the press position according to the rotation of the press roller 10.

The squeegee roller 30 is a squeegee smoothing the powder P supplied from the hopper 20 to the outer circumferential surface of the press roller 10. The squeegee roller 30 is formed in a column whose diameter is smaller than that of the press roller 10. The squeegee roller 30 is disposed near the press roller 10 such that the axis of the squeegee roller 30 is parallel to the axis of the press roller 10. That is, the squeegee roller 30 is formed in a column whose axis is parallel to the outer circumferential surface of the press roller 10 and is orthogonal to the moving direction (the rotational direction of the press roller 10) of the outer circumferential surface of the press roller 10. The squeegee roller 30 is disposed on the downstream side in the moving direction of the powder P relative to the hopper 20 and on the upstream side in the moving direction of the powder P relative to the press position such that a prescribed gap is formed between the press roller 10 and the squeegee roller 30.

The squeegee roller 30 is rotationally driven (see the arrows on the squeegee roller 30 in FIG. 1) in the same direction as the rotational direction of the press roller 10 positioned near the squeegee roller 30 by the prescribed conveying device (not illustrated). In detail, one squeegee roller 30 is rotationally driven in the same direction as the rotational direction of one press roller 10, and the other squeegee roller 30 is rotationally driven in the same direction as the rotational direction of the other press roller 10. In other words, the squeegee roller 30 rotates such that the part of the outer circumferential surface thereof facing the outer circumferential surface of the press roller 10 moves in the direction opposite to the moving direction of the outer circumferential surface of the press roller 10.

Figure 2:
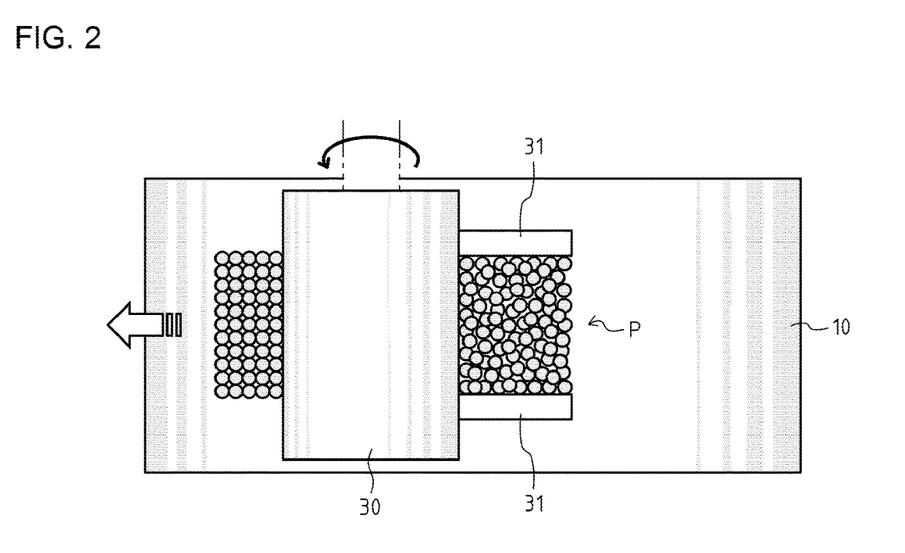
FIG. 2 shows how to smooth powder evenly with a squeegee roller.

As shown in FIG. 2, width adjusting plates 31 are provided such that the coated powder P has constant width (the vertical dimension in FIG. 2) when the coated powder P passes through the squeegee roller 30.

The width adjusting plates 31 are provided along the moving direction of the powder P, and are disposed across the powder P in the axial direction of the press roller 10 and the squeegee roller 30. The width adjusting plates 31 are formed so as not to come in contact with the press roller 10 and the squeegee roller 30. For example, the width adjusting plates 31 are fixed to the hopper 20 (see FIG. 1).

In the powder coating apparatus 1 configured as the above, the powder P supplied from one hopper 20 to the outer circumferential surface of one press roller 10 is smoothed by one squeegee roller 30 until the powder P arrives at the press position according to the rotation of one press roller 10, and the powder P supplied from the other hopper 20 to the outer circumferential surface of the other press roller 10 is smoothed by the other squeegee roller 30 until the powder P arrives at the press position according to the rotation of the other press roller 10. At the press position, the powder P supplied to the outer circumferential surface of one press roller 10 and the powder P supplied to the outer circumferential surface of the other press roller 10 are respectively pressed on one surface and the other surface of the web W. Therefore, the compressed powder layers L are formed on both the surfaces of the web W.

Both the surfaces of the web W are coated with an adhesive for gluing the powder P until the web W arrives at the press position.

The means for coating both the surfaces of the web W with the adhesive is not limited, and, for example, a gravure coater may be adopted.

The adhesive preferably includes conductive member.

Hereinafter, the squeegee roller 30 is described in detail with reference to FIG. 3.

Figure 3:
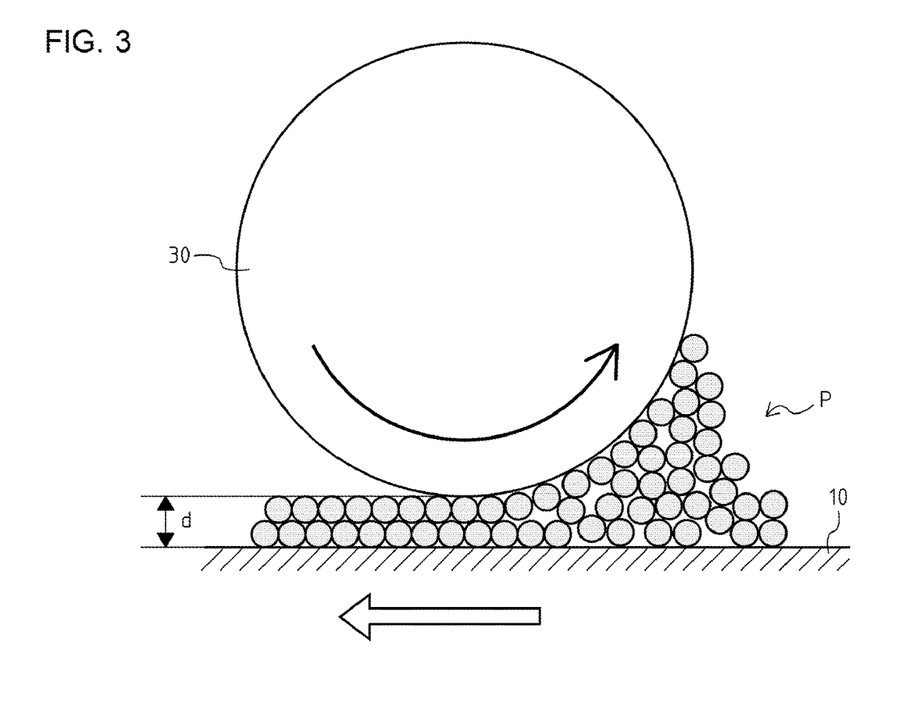
FIG. 3 shows how to smooth powder evenly with the squeegee roller.

As shown in FIG. 3, the squeegee roller 30 adjusts the thickness (the vertical dimension in FIG. 3) of the coated powder P evenly by smoothing the powder P supplied to the outer circumferential surface of the press roller 10. That is, the prescribed gap is formed between the press roller 10 and the squeegee roller 30, and when the powder P supplied to the outer circumferential surface of the press roller 10 passes through the gap, the thickness of the coated powder P is the shortest distance d between the outer circumferential surface of the press roller 10 and the outer circumferential surface of the squeegee roller 30.

The squeegee roller 30 can move relative to the press roller 10 so as to change the distance d.

As described above, the squeegee roller 30 is formed in a column.

Therefore, when the powder P is moved to the gap between the press roller 10 and the squeegee roller 30, the reaction force acts, on the powder P coming in contact with the outer circumferential surface of the squeegee roller 30, outward in the radial direction of the squeegee roller 30. That is, the reaction force toward the outer circumferential surface of the press roller 10 acts on the powder P situated between the press roller 10 and the squeegee roller 30.

The angle formed between the outer circumferential surface of the press roller 10 and the outer circumferential surface of the squeegee roller 30 gradually decreases as the powder P is moved to the gap between the press roller 10 and the squeegee roller 30. Therefore, the direction of the reaction force acting on the powder P coming contact in with the outer circumferential surface of the squeegee roller 30 gradually change.

This make it possible to restrain the powder P from staying on the outer circumferential surface of the squeegee roller 30 and to make the powder P smoothly pass through the gap between the press roller 10 and the squeegee roller 30. Therefore, it is possible to restrain the thickness of the coated powder P from being uneven and to make the thickness of the compressed powder layer L even.

As described above, the squeegee roller 30 is rotationally driven in the same direction as the rotational direction of the press roller 10. That is, the squeegee roller 30 is rotationally driven such that the force acts on the powder P in the direction opposite to the moving direction of the powder P.

This makes it possible to further restrain the powder P from staying on the outer circumferential surface of the squeegee roller 30.

The rotational speed of the squeegee roller 30 is preferably set to approximately 50% of the rotational speed of the press roller 10.

The squeegee roller 30 may not be rotationally driven.

The squeegee roller 30 is preferably vibrated.

This makes it possible to further restrain the powder P from staying on the outer circumferential surface of the squeegee roller 30.

The direction where the squeegee roller 30 vibrates is set such that the shortest distance d between the outer circumferential surface of the press roller 10 and the outer circumferential surface of the squeegee roller 30 is kept. In detail, the squeegee roller 30 is vibrated in the direction orthogonal to the direction where the axis of the squeegee roller 30 comes into and out of proximity with the axis of the press roller 10. It does not matter whether the squeegee roller 30 vibrates linearly or curvedly (in the present embodiment, curvedly along the outer circumferential surface of the squeegee roller 30)

The vibration of the squeegee roller 30 is set such that the thickness of the powder P having passed through the squeegee roller 30 is even (for example, frequency: 700 Hz, amplitude: 5 μm).

The powder coating apparatus 1 according to the present embodiment is configured such that the compressed powder layers L are formed on both the surfaces of the web W. However, the compressed powder layer L may be formed on at least one surface of the web W.

That is, the powder coating apparatus 1 may be configured such that the compressed powder layer L is formed on only one surface of the web W. In this case, one hopper 20 and one squeegee roller 30, or the other hopper 20 and the other squeegee roller 30 may not be provided.

In the present embodiment, the press roller 10 acts as a supply member according to the present invention, and the outer circumferential surface of the press roller 10 corresponds to a continuous surface of the supply member according to the present invention. The pair of press rollers 10 act as a pressing device according to the present invention. The driving device for rotationally driving the press rollers 10 acts as a driving device according to the present invention.

The web W may be used as the supply member according to the present invention. In this case, the conveying device for conveying the web W acts as the driving device according to the present invention.

Hereinafter, a step S1 for manufacturing an electrode as an embodiment of method for manufacturing an electrode for a lithium ion battery according to the present invention is described with reference to FIG. 4.

Figure 4:
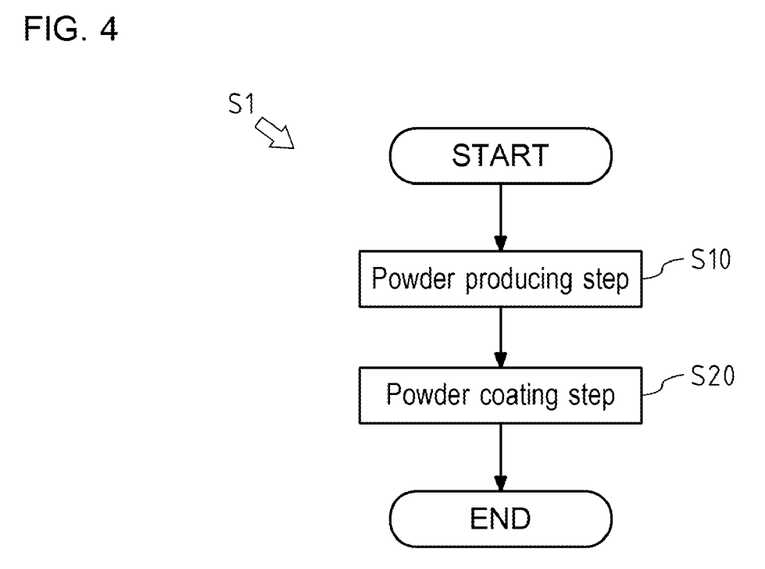
FIG. 4 shows a step for manufacturing an electrode for a lithium ion battery according to an embodiment of the present invention.

As shown in FIG. 4, the step S1 includes a powder producing step S10 and a powder coating step S20.

The powder producing step S10 is a step for producing the powder P as a group of particles including the active material.

In the powder producing step S10, first, paste is produced by dispersing active material and binder with a suitable additive (for example, conductive material) in solvent. Then, the powder P is produced by drying up the paste by spray-drying, freeze-drying, fluidizing bed granulating and so on. At this time, the powder P may be suitably classified.

The powder coating step S20 is a step for coating the surface of the web W as a collector with the powder P including the active material using the powder coating apparatus 1.

In the powder coating step S20, the compressed powder layers L are formed on both the surfaces of the web W by pressing the powder P on both the surfaces of the web W.

As described above, in the step S1, the electrode where the compressed powder layers L are formed on both the surfaces of the web W as the collector is manufactured by passing through the powder producing process S10 and the powder coating step S20.

In the electrode manufactured using the powder coating apparatus 1, the compressed powder layers L are formed in even thickness.

Therefore, according to the step S1, the electrode having excellent quality (output and the like) can be manufactured.

INDUSTRIAL APPLICABILITY

The present invention is applicable to a powder coating apparatus for coating the surface of a web with powder, and a method for manufacturing an electrode for a lithium ion battery using the powder coating apparatus.

REFERENCE SIGNS LIST

1: powder coating apparatus
10: press roller (supply member, pressing device)
20: hopper (powder supplying device)
30: squeegee roller (squeegee)
P: powder
L: compressed powder layer

The invention claimed is:
1. A powder coating apparatus comprising:
    a driving device driving a supply member having a continuous surface such that the continuous surface moves in a prescribed direction;
    a powder supplying device supplying powder to the continuous surface of the supply member;
    a squeegee disposed such that a prescribed gap is formed between the squeegee and the supply member, and adjusting thickness of the powder by smoothing the powder supplied to the continuous surface of the supply member by the powder supplying device; and a pressing device pressing the powder smoothed by the squeegee;

wherein the squeegee is formed in a column having an axis being parallel to the continuous surface of the supply member and being orthogonal to a moving direction of the continuous surface of the supply member;

wherein the squeegee vibrates such that the shortest distance between the outer circumferential surface of the squeegee and the continuous surface of the supply member is kept; and;

wherein the squeegee vibrates in a direction orthogonal to the direction where the axis of the squeegee comes into and out of proximity with the axis of the pressing device;

wherein the powder coating apparatus further comprises width adjusting plates maintaining a constant width of the powder supplied to the continuous surface of the supply member; and wherein the width adjusting plates are fixed to the powder supplying device.

2. The powder coating apparatus according to claim 1 wherein the squeegee is rotationally driven such that a part of an outer circumferential surface thereof facing the continuous surface of the supply member moves in the direction opposite to the moving direction of the continuous surface of the supply member.

3. The powder coating apparatus according to claim 1, wherein;

the width adjusting plates are provided along the moving direction of the continuous surface of the supply member, and are disposed across the continuous surface of the supply member in the axial direction of the pressing device.

4. The powder coating apparatus according to claim 1, wherein;

the width adjusting plates are formed so as not to come in contact with the pressing device and the squeegee.

5. A method for manufacturing an electrode for a lithium ion battery comprising:

forming a compressed powder layer made of a powder containing active material on at least one surface of a collector made of a metal sheet, using the powder coating apparatus according to claim 1.

* * * * *